(12) United States Patent
Kitami et al.

(10) Patent No.: US 6,988,582 B2
(45) Date of Patent: Jan. 24, 2006

(54) GEAR, REDUCTION GEAR COMBINATION AND ELECTRIC POWER STEERING APPARATUS

(75) Inventors: Etsurou Kitami, Yamatokooriyama (JP); Hiroaki Murakami, Kashihara (JP); Tomohiro Maekawa, Habikino (JP); Tomomasa Machida, Kashiwara (JP); Kaname Joshita, Kashiba (JP); Teruo Tsutsui, Yao (JP)

(73) Assignee: Koyo Seiko Co., Ltd., Osaka (JP)

( * ) Notice: Subject to any disclaimer, the term of this patent is extended or adjusted under 35 U.S.C. 154(b) by 269 days.

(21) Appl. No.: 10/340,538

(22) Filed: Jan. 10, 2003

(65) Prior Publication Data

US 2004/0084865 A1 May 6, 2004

(30) Foreign Application Priority Data

Nov. 1, 2002 (JP) .................................. 2002-005364

(51) Int. Cl.
F16H 35/12 (2006.01)
F16H 55/10 (2006.01)

(52) U.S. Cl. ........................................ 180/444; 74/440
(58) Field of Classification Search ................ 180/443, 180/444, 446; 74/461, 409, 411, 440
See application file for complete search history.

(56) References Cited

U.S. PATENT DOCUMENTS 4,674,351 A * 6/1987 Byrd ........................... 74/443
4,831,897 A * 5/1989 Dobbs ......................... 74/411
4,912,998 A * 4/1990 Sugano et al. ................ 74/409
5,157,978 A * 10/1992 Morishita et al. ............. 74/7 E
5,307,705 A * 5/1994 Fenelon ....................... 74/411
5,911,788 A * 6/1999 Russ et al. ................... 74/411
6,551,096 B2 * 4/2003 Saito et al. ................. 431/153

FOREIGN PATENT DOCUMENTS

| DE | 101 19 235 A1 | 10/2001 |
|---|---|---|
| EP | 0 657 340 A1 | 6/1995 |
| JP | 09002297 A1 | 1/1997 |
| JP | 2000-043739 | 2/2000 |
| JP | 2001-334946 | 4/2001 |
| JP | 2002333059 A1 | 11/2002 |

* cited by examiner

Primary Examiner—Avraham Lerner
(74) Attorney, Agent, or Firm—Darby & Darby

(57) ABSTRACT

A worm 1 is composed of an annular tooth body 11 having a tooth 10 on the outer surface thereof, a core body 12 inserted inside the annular tooth body 11; and an elastic coupler 13, which can be transformed in the radial direction, for coupling the core body 12 with the annular tooth body 11. The worm 1 is engaged with the worm wheel with the elastic coupler 13 being transformed in the radial direction in such a manner that a negative amount of backlash is generated at the engagement portion. This can be also employed for the worm wheel. With a reduction gear combination having this structure, the backlash amount at the engagement portion can be adjusted to a proper amount without selecting elements such as the worm and the worm wheel to be assembled.

24 Claims, 10 Drawing Sheets

GEAR, REDUCTION GEAR COMBINATION AND ELECTRIC POWER STEERING APPARATUS

BACKGROUND OF THE INVENTION

1. Field of the Invention

The present invention relates to a gear having teeth on the outer surface thereof, a reduction gear combination using the gear as a pinion and/or a gear wheel, and an electric power steering apparatus comprising the reduction gear combination.

2. Description of Related Art

FIG. 1 is a sectional view showing the structure of a conventional reduction gear combination provided in an electric power steering apparatus.

The reduction gear combination provided in an electric power steering apparatus comprises a worm 102 having one end connected to a drive shaft 101 of a steering assist motor 100 and a worm wheel 103 engaged with the worm 102. The worm wheel 103 is fixed on a rotary shaft 104. The rotary shaft 104 is supported in a housing 105 by a couple of antifriction bearings (which are not illustrated in the figure).

The worm 102 includes a right cylinder member made of metal and a helical tooth which is integrally formed on the outer surface of the right cylinder member. The worm 102 is supported in the housing 105 by a couple of antifriction bearings 106 and 107, with the axis thereof crossing the axis of the rotary shaft 104.

The worm 102 and worm wheel 103 of the reduction gear combination are assembled in such a manner that movement in the radial direction of each gear is prevented. However, since a dimensional error occurs in each of manufactured worms 102 and worm wheels 103, the backlash amount at the engagement portion of the worm 102 and worm wheel 103 varies if the gears are assembled taking no account of the dimensional error. When the backlash is large, rattling noise occurs during steering and heard in the passenger's room of a car. On the other hand, when the backlash is small, a load is increased and the worm 102 and worm wheel 103 cannot be rotated smoothly.

To solve this problem, in the prior art, a stratified assembling method is employed to set a proper backlash amount at the engagement portion. In this method, manufactured worms 102, worm wheels 103, antifriction bearings 106 and 107, housings 105 and the like are first sorted into a plurality of dimension groups for each design dimension. A set of a worm 102, worm wheel 103, antifriction bearings 106 and 107 and housing 105 to be assembled is then selected from the sorted dimension groups, so that the centre distance H between the worm 102 and the worm wheel 103 is set within a permissible range.

However, in the above method for manufacturing a reduction gear combination and an electric power steering apparatus wherein a worm 102, worm wheel 103, antifriction bearings 106 and 107 and housing 105 to be assembled are selected from a plurality of sorted dimension groups, strict dimension control is required and the amount of inventories to be selected from is large. Consequently, there arises a problem that assembling needs much time, which causes high cost.

BRIEF SUMMARY OF THE INVENTION

The present invention has been made with the aim of solving the above problems, and it is the main object thereof to provide a reduction gear combination and an electric power steering apparatus in which a backlash amount at an engagement portion can be adjusted without selecting a worm, worm wheel and the like to be assembled, and to provide a gear to be used for this purpose.

A gear according to the present invention is composed of an annular tooth body having a tooth on the outer surface thereof; a core body inserted inside the annular tooth body; and a coupler made of elastic material, which couples the core body with the annular tooth body.

In this gear, the elastic coupler for coupling the core body with the annular tooth body can be transformed in the radial direction. Accordingly, the elastic coupler can be transformed in the radial direction when the gear engages with another gear, so that an increase of engagement friction at an engagement portion can be depressed.

A reduction gear combination according to the present invention comprises a pinion and a gear wheel engaged with the pinion. The pinion and/or gear wheel is constituted of the gear according to the present invention.

In this reduction gear combination, the elastic coupler for coupling the core body with the annular tooth body can be transformed in the radial direction. Accordingly, by putting a tooth flank of the pinion into contact with a tooth flank of the gear wheel with the elastic coupler being transformed in the radial direction, the gear combination can be assembled in such a manner that a preload due to the transformation of the coupler is applied between the tooth flanks, i.e., in such a manner that a negative amount of backlash is generated at the engagement portion. As a result, the gear combination can be easily assembled so as to have a centre distance within a permissible range. Moreover, the centre distance can be maintained within the permissible range even if abrasion of teeth increases. Furthermore, since the elastic coupler can be transformed in the radial direction when the gear engages with another gear, an increase of engagement friction at the engagement portion can be depressed and the pinion and gear wheel can be rotated smoothly.

The reduction gear combination according to the present invention may further comprise limiting means for limiting relative turn between the annular tooth body and the coupler and relative turn between the core body and the coupler.

With this reduction gear combination, relative turn between the annular tooth body and the coupler and relative turn between the core body and the coupler can be respectively limited by the limiting means. Accordingly, the binding strength between the annular tooth body and the coupler and the binding strength between the core body and the coupler can be maintained for a long time.

In the reduction gear combination according to the present invention, the annular tooth body may be made of synthetic resin, and the core body may be made of metal.

With this reduction gear combination having an annular tooth body made of synthetic resin, jarring noise generated by the engagement of gears can be lowered.

A coefficient of linear expansion $\beta$ of an annular tooth body made of synthetic resin is larger than a coefficient of linear expansion $\alpha$ of a core body made of metal approximately in the radio of 10 to 1, so that the annular tooth body tends to expand with a rise in temperature and a rise in humidity of a gear due to a change in atmosphere temperature and the like. However, if the annular tooth body expands, the elastic coupler can be transformed in the radial direction when the gear engages with another gear, so that the volume increase caused by the expansion can be absorbed by the elastic coupler. As a result, the volume increase of the annular tooth body outward in the radial direction can be depressed by the elastic coupler, and thereby the engagement can be kept from clogging due to the volume increase.

In the reduction gear combination according to the present invention, the coupler may be coupled with the core body via a coupling ring made of synthetic resin having larger rigidity than the elastic material of the coupler.

In this reduction gear combination, the core body made of metal is not combined with the elastic coupler directly but combined with the coupling ring made of synthetic resin having larger rigidity than the elastic material of the coupler, which coupling ring is combined with the annular tooth body. Accordingly, the binding strength between the annular tooth body and the core body can be maintained for a long time.

An electric power steering apparatus according to the present invention comprises: a reduction gear combination according to the present invention; a steering assist motor connected with the pinion; and transmitting means for transmitting rotational force of the gear wheel associated with rotation of the motor to a steering mechanism.

By putting a tooth flank of the pinion into contact with a tooth flank of the gear wheel with the elastic coupler inserted into the engagement portion of the annular tooth body and core body being transformed in the radial direction, this electric power steering apparatus can be assembled in such a manner that a preload due to the transformation of the coupler is applied between the tooth flanks, i.e., in such a manner that a negative amount of backlash is generated at the engagement portion of the pinion and gear wheel. Accordingly, the gears can be easily assembled so as to have a centre distance within the permissible range, and moreover, the centre distance can be maintained within the permissible range even if abrasion of teeth increases. Moreover, since the coupler can be transformed in the radial direction when the pinion engages with the gear wheel, an increase of engagement friction at the engagement portion can be depressed and the pinion and gear wheel can be rotated smoothly. Consequently, occurrence of rattling noise due to a backlash is prevented by the elastic coupler and the steering wheel can be rotated back to the initial position smoothly after the steering assist of the motor.

The above and further objects and features of the invention will more fully be apparent from the following detailed description with accompanying drawings.

DETAILED DESCRIPTION OF THE INVENTION

The following description will explain the present invention in detail with reference to the drawings illustrating some embodiments thereof.

First Embodiment

Figure 1:
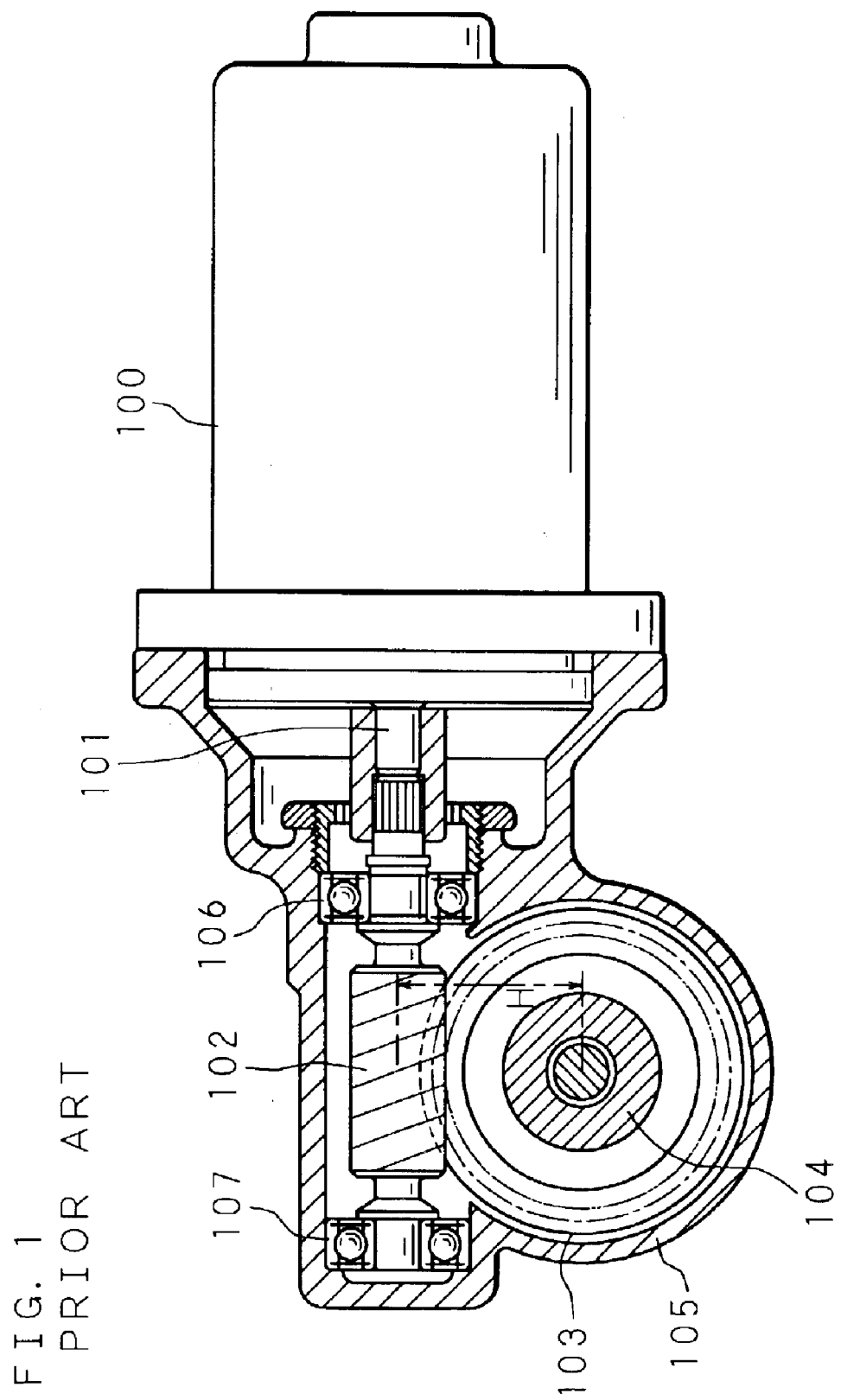
FIG. 1 is a sectional view showing the structure of a conventional reduction gear combination provided in an electric power steering apparatus.
Figure 2:
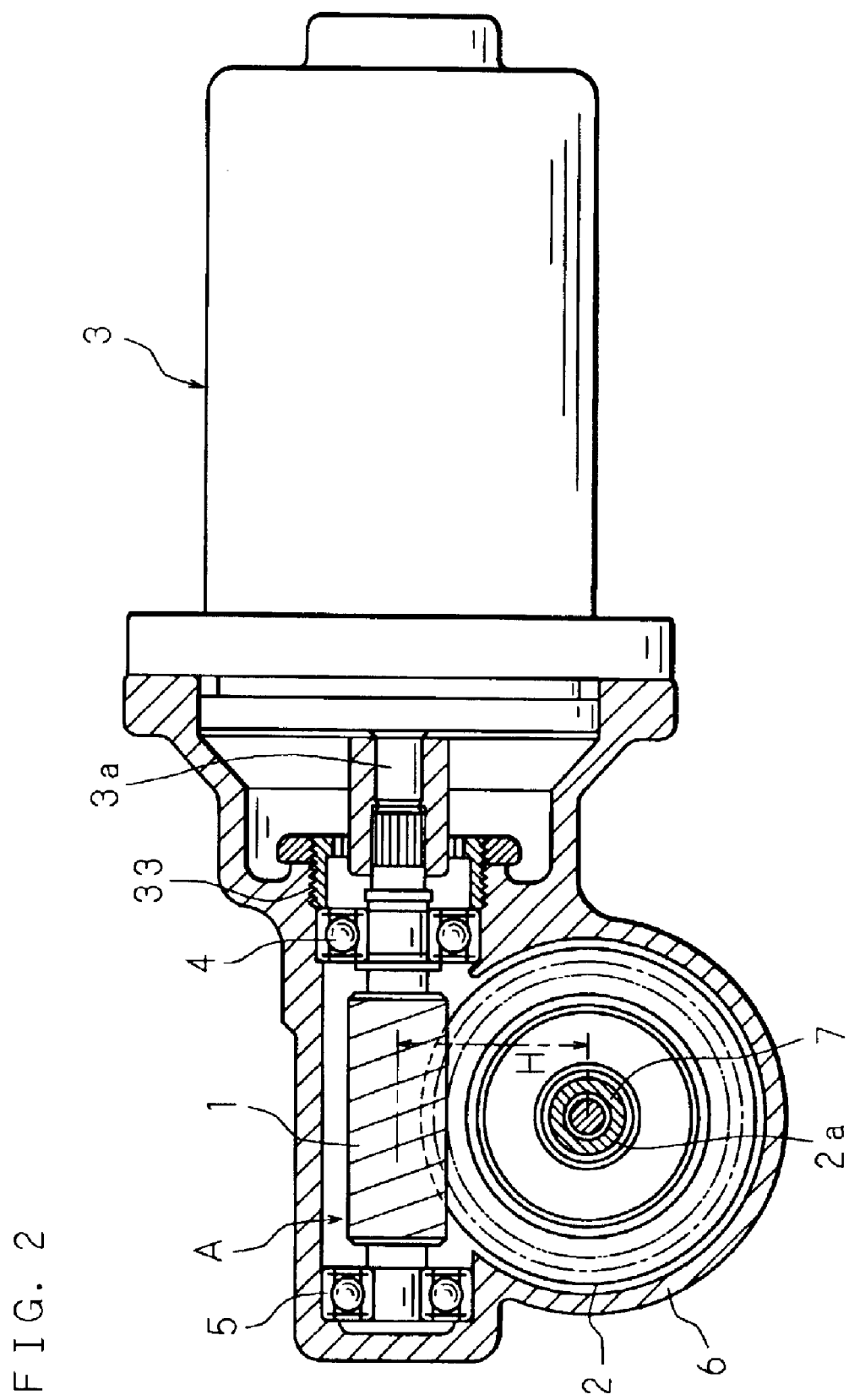
FIG. 2 is a sectional view showing the structure of the first embodiment of a gear combination according to the present invention.
Figure 3:
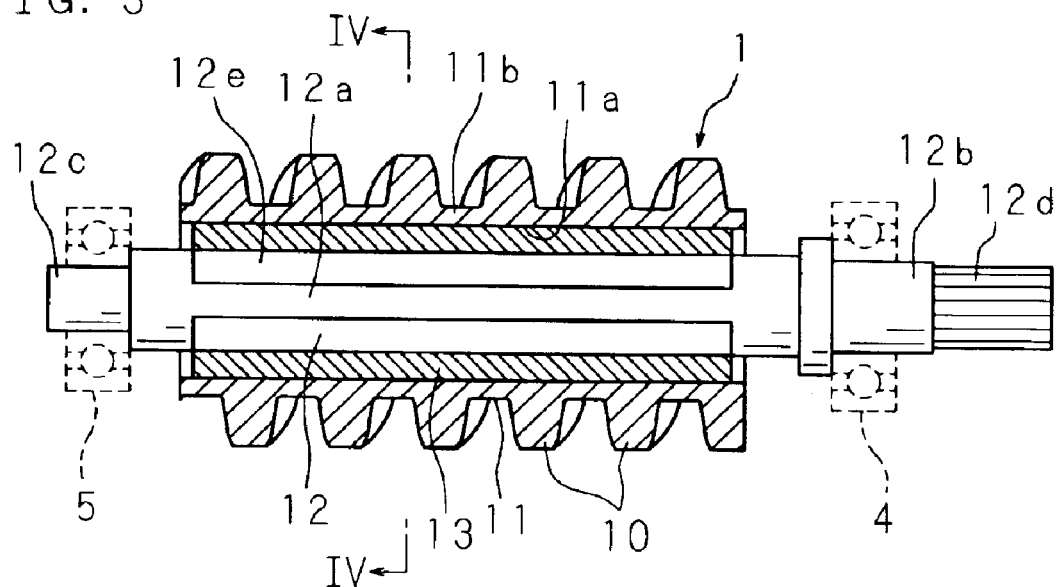
FIG. 3 is an enlarged sectional view showing the structure of a worm of a gear combination according to the present invention.
Figure 4:
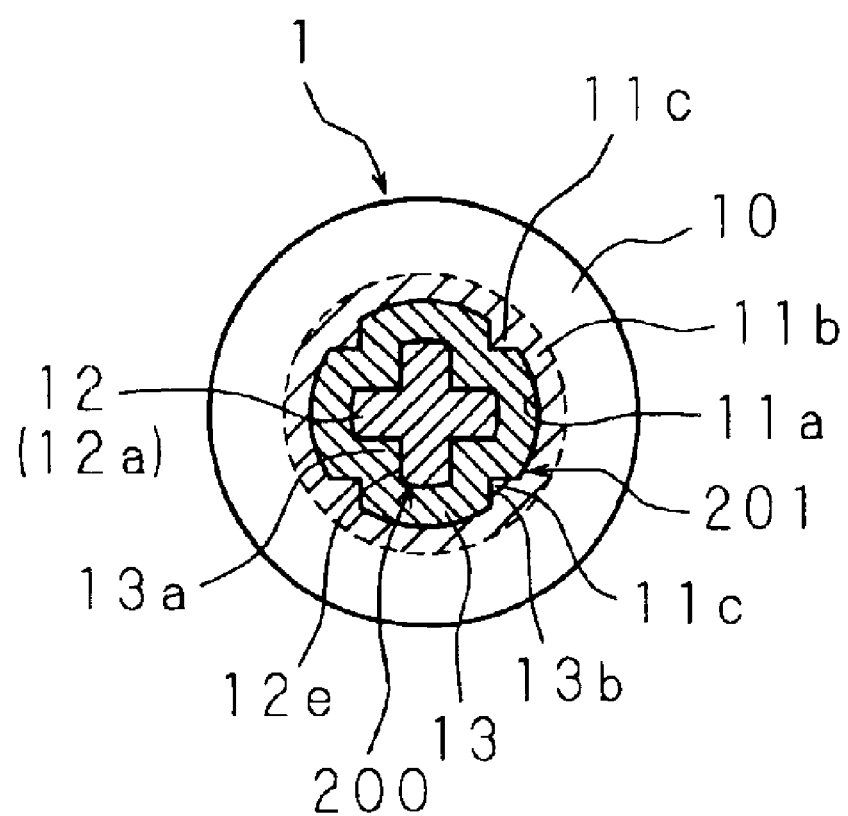
FIG. 4 is a sectional view taken along the line IV—IV in FIG. 3.

FIG. 2 is a sectional view showing the structure of the first embodiment of a gear combination according to the present invention; FIG. 3 is an enlarged sectional view showing the structure of a worm of the gear combination; and FIG. 4 is a sectional view taken along the line IV—IV in FIG. 3.

The gear combination comprises a worm 1 made of metal which includes a helical tooth 10 on the outer surface thereof, and a worm wheel 2 engaged with the worm 1.

The worm 1 is composed of an annular tooth body 11 having a tooth 10 on the outer surface thereof; a cylindrical core body 12 inserted inside the annular tooth body 11; and an annular elastic coupler 13, which can be transformed in the radial direction, for coupling the core body 12 with the annular tooth body 11.

The annular tooth body 11 is constituted of an annular coupling portion 11b having a noncircular through bore 11a at the inner surface thereof, and the tooth 10 formed on the outer surface of the annular coupling portion 11b through gear cutting. The through bore 11a is, for example, formed to have an approximately cruciform section, so that relative turn between the through bore 11a and the elastic coupler 13 is prevented.

The core body 12 includes: a noncircular coupling shaft portion 12a; fitting shaft portions 12b and 12c extending from both ends of the coupling shaft portion 12a; and a jointing shaft portion 12d, which is jointed with a drive shaft 3a of a motor 3, extending from one fitting shaft portion 12b. The core body 12 is rotatably supported in a housing 6 by two antifriction bearings 4 and 5 fitted at the fitting shaft portions 12b and 12c. The coupling shaft portion 12a is formed to have an approximately cruciform section, by applying press forming (forging) to the outer surface of a cylindrical member and providing a plurality of approximately v-shaped concavities 12e. The elastic coupler 13 is provided with convexities 13a to be engaged with the concavities 12e. The concavities 12e and convexities 13a constitute relative turn limiting means 200 for preventing relative turn between the core body 12 and the elastic coupler 13. The elastic coupler 13 is further provided with concavities 13b formed on the outer surface thereof, and the annular coupling portion 11b is provided with convexities 11c in correspondence to the concavities 13b. The concavities 13b and convexities 11c constitute relative turn limiting means 201 for limiting relative turn between the elastic coupler 13 and the annular coupling portion 11b. In such a manner, the relative turn limiting means 200 and 201 limit relative turn between the annular tooth body 11 and the core body 12. It should be understood that the relative turn limiting means 200 and 201 may be constituted of a plurality of, for example, serration or spline convexities/concavities which are integrally formed in a spaced manner on the coupling shaft portion 12a, the inner and outer surfaces of the elastic coupler 13 and the through bore 11a, inward and/or outward in the radial direction. The shape thereof is not limited as long as relative turn between the members can be limited.

The elastic coupler 13 is made of rubber. The elastic coupler 13 is formed annularly by putting vulcanized rubber into a mold which houses the coaxially arranged annular tooth body 11 and core body 12. By this forming method, the annular tooth body 11 and the core body 12 are bonded with each other through vulcanization. It should be understood that the elastic coupler 13 may be made of synthetic resin capable of transformation. In this case, the elastic coupler 13 is formed annularly by, for example, putting an elastomer into a mold which houses the coaxially arranged annular tooth body 11 and core body 12.

The worm wheel 2 is fixed on a rotary shaft 7 at a fitting bore 2a formed at a center portion thereof. The rotary shaft 7 is rotatably supported in the housing 6 by a couple of antifriction bearings (34 and 35 in FIG. 5).

Figure 5:
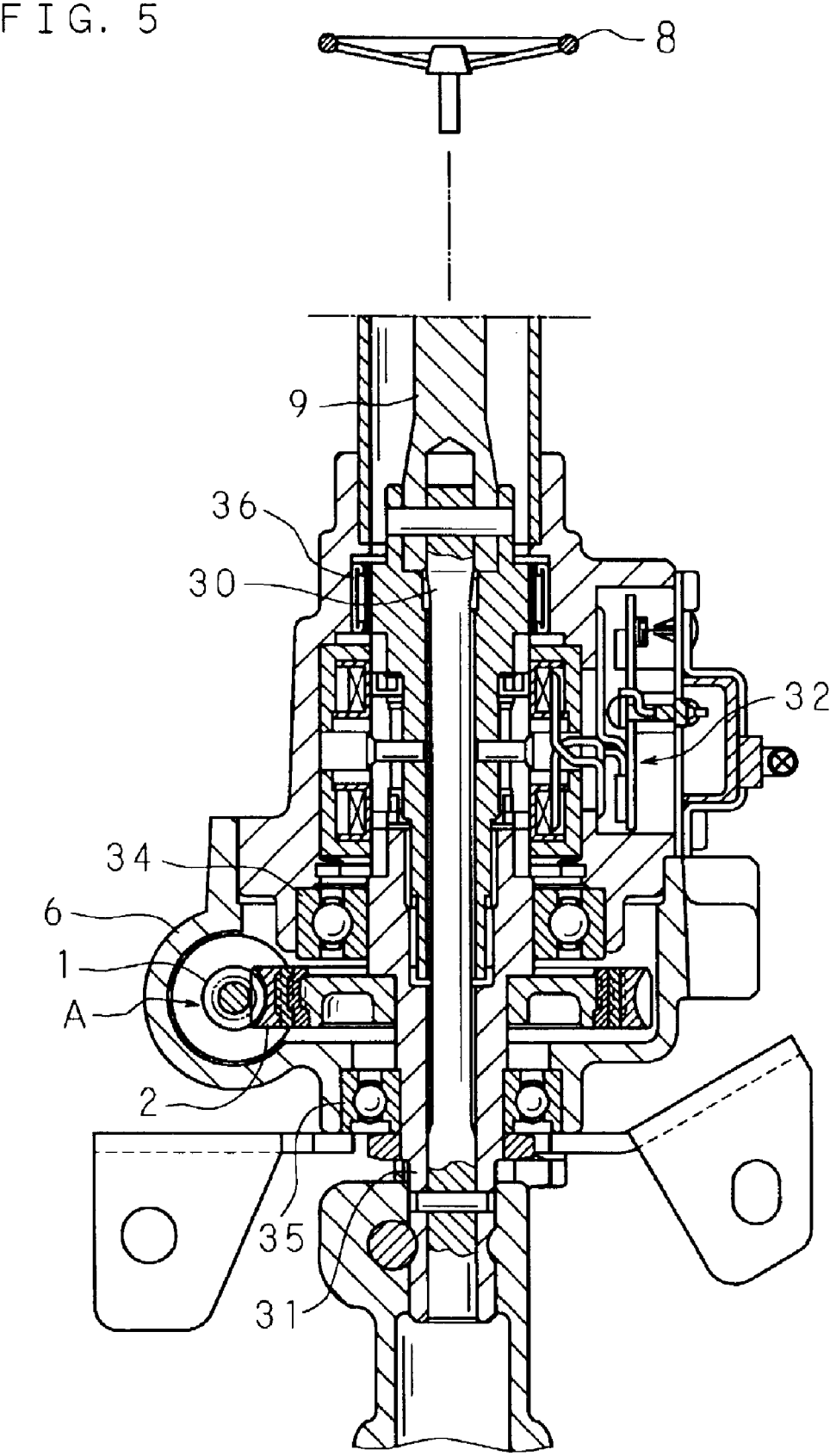
FIG. 5 is a sectional view showing the structure of an electric power steering apparatus according to the present invention.

The gear combination A thus constructed is used, for example, in an electric power steering apparatus. FIG. 5 is a sectional view showing the structure of an electric power steering apparatus according to the present invention.

The electric power steering apparatus comprises: an input shaft 9 which has an upper end connected with a steering wheel 8 for steering and a cylindrical portion at the lower end thereof, a torsion bar 30 inserted into the cylindrical portion, which has an upper end coaxially connected with the cylindrical portion of the input shaft 9 so as to be tortile by the action of steering torque applied to the steering wheel 8; an output shaft 31 which has an upper end coaxially connected with a lower end of the torsion bar 30; a torque sensor 32 for detecting a steering torque applied to the steering wheel 8 on the basis of the relative rotational displacement amount of the input shaft 9 and the output shaft 31 due to torsion of the torsion bar 30; the steering assist motor 3 which is driven on the basis of the torque detected by the torque sensor 32; the gear combination A (reduction gear combination) interlocking with rotation of the motor 3, which transmits the rotation to the output shaft 31 in a reduced manner; and the housing 6 which houses the torque sensor 32 and gear combination A. The motor 3 is attached to the housing 6. It should be noted that the output shaft 31 constitutes the rotary shaft 7.

The gear combination A is arranged with the worm 1 crossing the axis of the output shaft 31. The jointing shaft portion 12d of the worm 1 is jointed with the drive shaft 3a of the motor 3 in such a manner that the worm 1 is supported in the housing 6 by two antifriction bearings 4 and 5 fitted on the fitting shaft portions 12b and 12c of the core body 12. Movement of the worm 1 in the axial direction is prevented through relative movement of an inner race and an outer race of the antifriction bearings 4 and 5 in the axial direction made by a thread ring 33 fitted in the housing 6.

The worm wheel 2 is supported in the housing 6 by two antifriction bearings 34 and 35 fixed in the middle of the output shaft 31 in the axial direction. Rotation of the drive shaft 3a is reduced by engagement of the worm 1 and the worm wheel 2, transmitted to the output shaft 31, and transmitted via a universal joint to a steering mechanism (which is not illustrated in the figure) of, for example, a rack-and-pinion type. It should be noted that the output shaft 31 and universal joint constitute transmitting means for transmitting rotation of the worm wheel 2 to the steering mechanism. The reference number 36 in FIG. 5 indicates a bearing for supporting the input shaft 9 at the housing 6.

In the gear combination A and the electric power steering apparatus thus constructed, the worm 1 has an elastic coupler 13, which can be transformed in the radial direction, between the annular tooth body 11 and the core body 12. The centre distance H between the worm 1 and the worm wheel 2 is such preset that the backlash amount at the engagement portion is smaller than, for example, a generally used initial set value by the transformation of the elastic coupler 13. Accordingly, for assembling the gear combination A, the worm 1 and the worm wheel 2 can be engaged with each other with the elastic coupler 13 of the worm 1 being transformed. When the gear combination A is assembled in such a manner, the elastic coupler 13 of the worm 1 can be transformed in the radial direction and an increase of engagement friction at the engagement portion can be depressed, so that the worm 1 and worm wheel 2 can be rotated smoothly.

When the teeth of the worm 1 and worm wheel 2 abrade away and the backlash amount increases after long use, the backlash amount can be depressed at the same level as the generally used initial set value for an extremely long time from the beginning and the centre distance H can be maintained within a permissible range.

The core body 12 of the worm 1 is supported at the housing 6 by the two antifriction bearings 4 and 5, and the annular tooth body 11 is coupled with the outer surface of the core body 12 by the elastic coupler 13. Consequently, even if a dimensional error occurs at the fitting portion between the fitting shaft portion 12d of the worm 1 and the drive shaft 3a and at a supported portion where the worm 1 is supported at the housing 6 by the antifriction bearings 4 and 5, the axial runout of the worm 1, i.e. the axial runout of the core body 12, can be absorbed by the elastic coupler 13 and thereby occurrence of noise due to the axial runout can be prevented.

Second Embodiment

Figure 6:
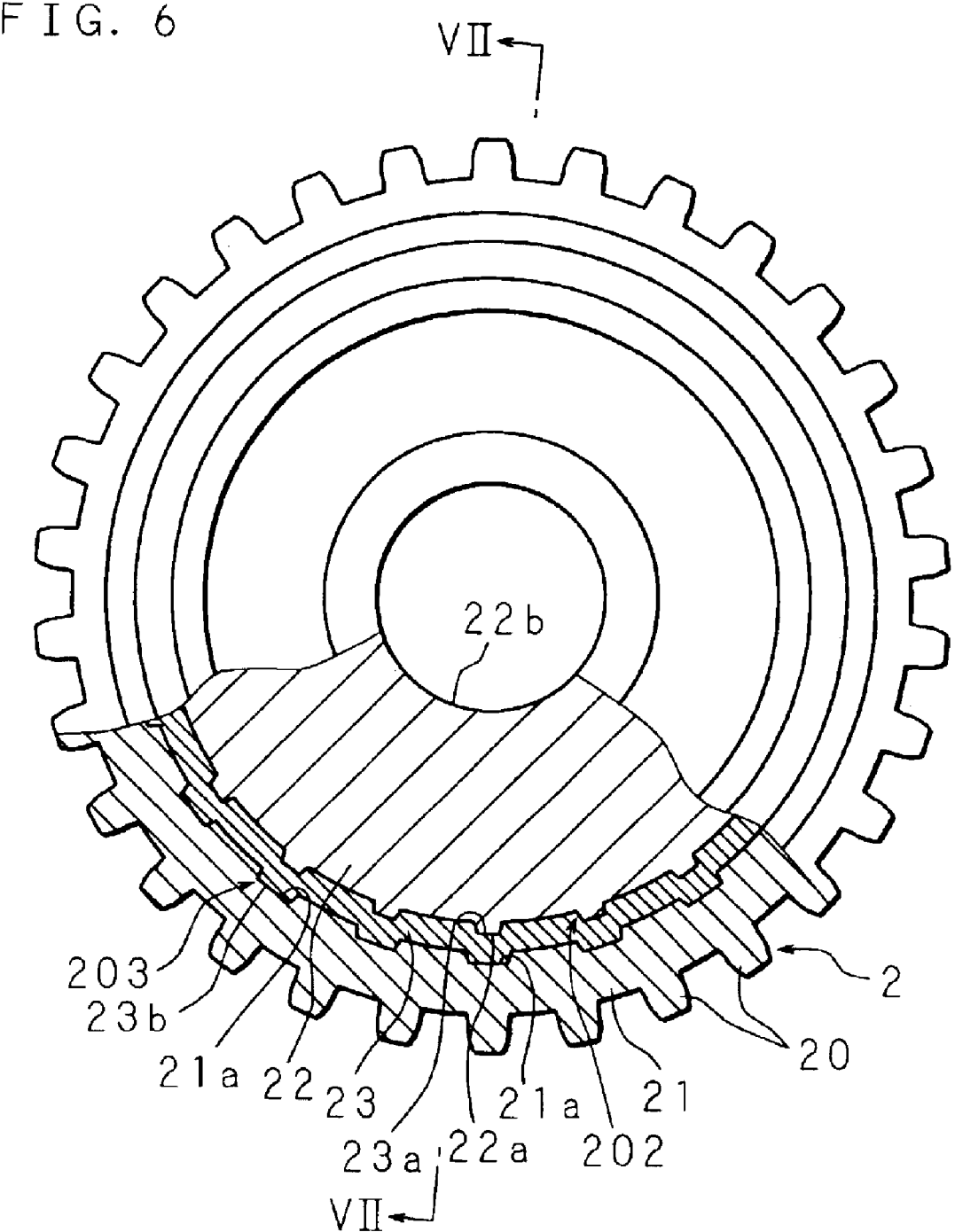
FIG. 6 is a front view which shows, partly in section, the structure of a worm wheel of the second embodiment of a gear combination according to the present invention.
Figure 7:
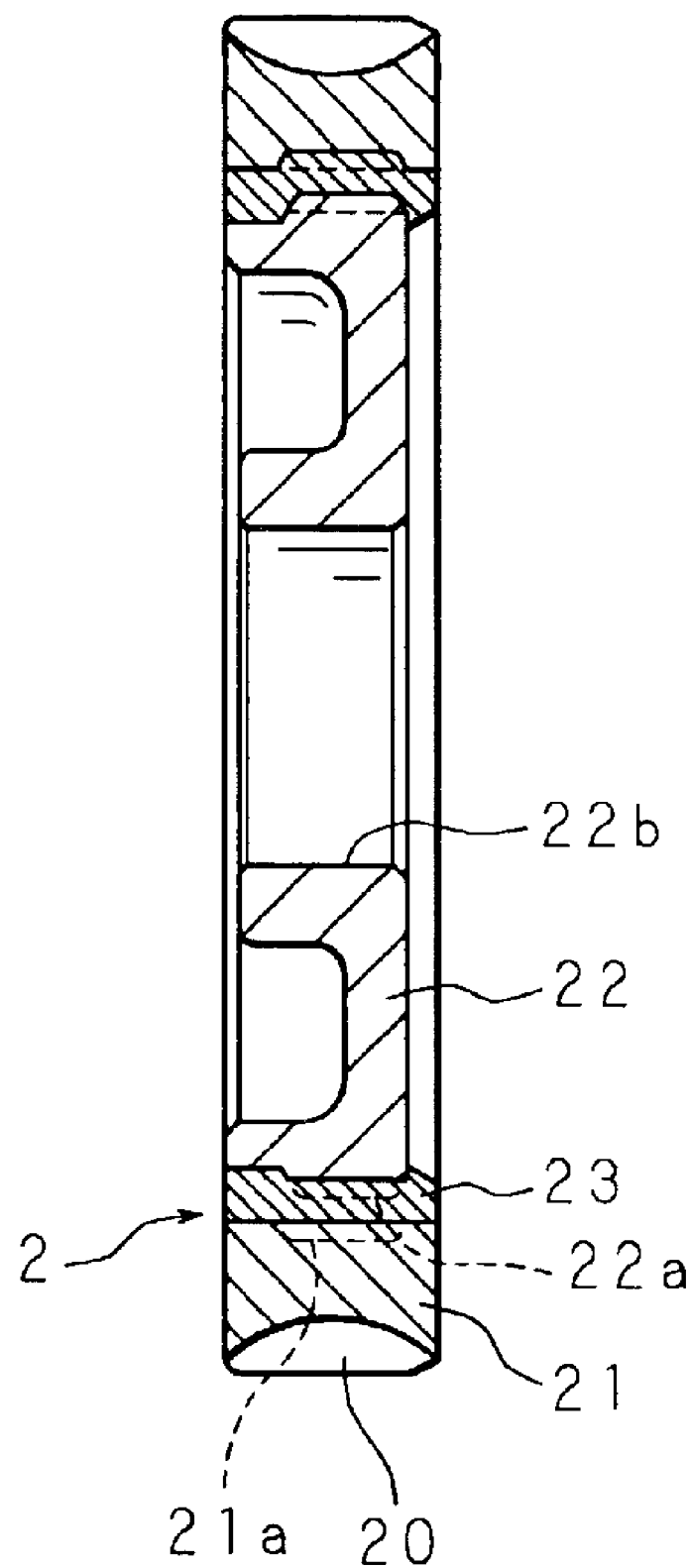
FIG. 7 is a sectional view taken along the line VII—VII in FIG. 6.

FIG. 6 is a front view which shows, partly in section, the structure of a worm wheel of the second embodiment of a gear combination according to the present invention; and FIG. 7 is a sectional view taken along the line VII—VII in FIG. 6.

In the gear combination A of the second embodiment, the worm 1 does not have the above-mentioned annular tooth body 11, core body 12 and elastic coupler 13, and the whole body thereof is integrally formed of metal. On the other hand, the worm wheel 2 of this embodiment comprises: an annular tooth body 21 made of synthetic resin having a tooth 20 on the outer surface thereof; a core body 22 made of metal inserted inside the annular tooth body 21; and an elastic coupler 23 made of synthetic resin, which can be transformed in the radial direction, for coupling the core body 22 with the annular tooth body 21.

In the second embodiment, the core body 22 is formed in a disk shape with metal material such as low carbon steel. The outer surface of the core body 22 is provided with a plurality of whirl-stop protrusions 22a integrally formed in a spaced manner in the peripheral direction. The center portion of the core body 22 is provided with a fitting bore 22b, which is fitted on the rotary shaft 7. The elastic coupler 23 is provided with recesses 23a to be engaged with the protrusions 22a. The protrusions 22a and recesses 23a constitute relative turn limiting means 202 for limiting relative turn between the core body 22 and the elastic coupler 23.

The annular tooth body 21 is formed by injecting melted synthetic resin, such as nylon resin or polyamide resin, into a mold. The formed annular tooth body 21 is coupled with the core body 22 via the elastic coupler 23. The inner surface of the annular tooth body 21 is provided with a plurality of whirl-stop recesses 21a formed in a spaced manner in the peripheral direction. The elastic coupler 23 is provided with protrusions 23b to be engaged with the recesses 21a. The recesses 21a and protrusions 23b constitute relative turn limiting means 203 for preventing relative turn between the annular tooth body 21 and the elastic coupler 23. It should be understood that, instead of forming the tooth 20 in a mold, the tooth 20 may be formed through gear cutting after an annular element body 21 without a tooth 20 is formed.

The elastic coupler 23 is made of synthetic resin capable of transformation. The elastic coupler 23 is formed annularly by putting an elastomer into a mold which houses the coaxially arranged annular tooth body 21 and core body 22. By this forming method, the elastic coupler 23 is bonded through fusion with the inner surface of the annular tooth body 21 and the outer surface of the core body 22. It should be understood that the elastic coupler 23 may be made of rubber. In this case, for example, the elastic coupler 23 to be fitted with the inner surface of the annular tooth body 21 and the outer surface of the core body 22 is formed, the inner surface of the annular tooth body 21 and the outer surface of the core body 22 are coated with a primer, and the members are heated with the elastic coupler 23 being fitted between the inner surface of the annular tooth body 21 and the outer surface of the core body 22 so that the primer is melted, to couple the elastic coupler 23 with the annular tooth body 21 and the core body 22.

It should be also understood that the shape of the relative turn limiting means 202 and 203 is not limited as long as relative turn between the core body 22 and the elastic coupler 23 and relative turn between the annular tooth body 21 and the core body 22 can be limited.

In the second embodiment, the worm wheel 2 has an elastic coupler 23, which can be transformed in the radial direction, between the annular tooth body 21 made of synthetic resin and the core body 22 made of metal. The centre distance H between gears is such preset that the backlash amount at the engagement portion is smaller than, for example, a generally used initial set value by the transformation of the elastic coupler 23. Accordingly, for assembling the gear combination A, the worm 1 and the worm wheel 2 can be engaged with each other with the elastic coupler 23 of the worm wheel 2 being transformed. When the gear combination A is assembled in this manner, the elastic coupler 23 of the worm wheel 2 can be transformed in the radial direction and an increase of engagement friction at the engagement portion can be depressed, so that the worm 1 and worm wheel 2 can be rotated smoothly.

When the teeth 10 of the worm 1 and the teeth 20 of the worm wheel 2 abrade away and the backlash amount increases after long use, the backlash amount can be depressed at the same level as the generally used initial set value for an extremely long time from the beginning and the centre distance H can be maintained within the permissible range.

The annular tooth body 21 of the worm wheel 2 having the tooth 20 is made of synthetic resin having a coefficient of linear expansion larger than a coefficient of linear expansion of the core body 22 made of metal approximately in the radio of 10 to 1. Consequently, the annular tooth body 21 expands with a rise in temperature and a rise in humidity of the worm wheel 2 due to a change in atmosphere temperature and the like, and the volume of the annular tooth body 21 increases in the radial direction. However, the tooth 20 of the annular tooth body 21 whose volume has increased is pressed against a tooth flank of the worm 1, transforming the elastic coupler 23 and the annular tooth body 21 inward in the radial direction, so that the volume increase can be partly absorbed by the elastic coupler 23, and thereby the engagement can be kept from clogging.

Since other structures and functions are the same as those of the first embodiment, like codes are used to refer to like parts and detailed explanation thereof are omitted here.

Third Embodiment

Figure 8:
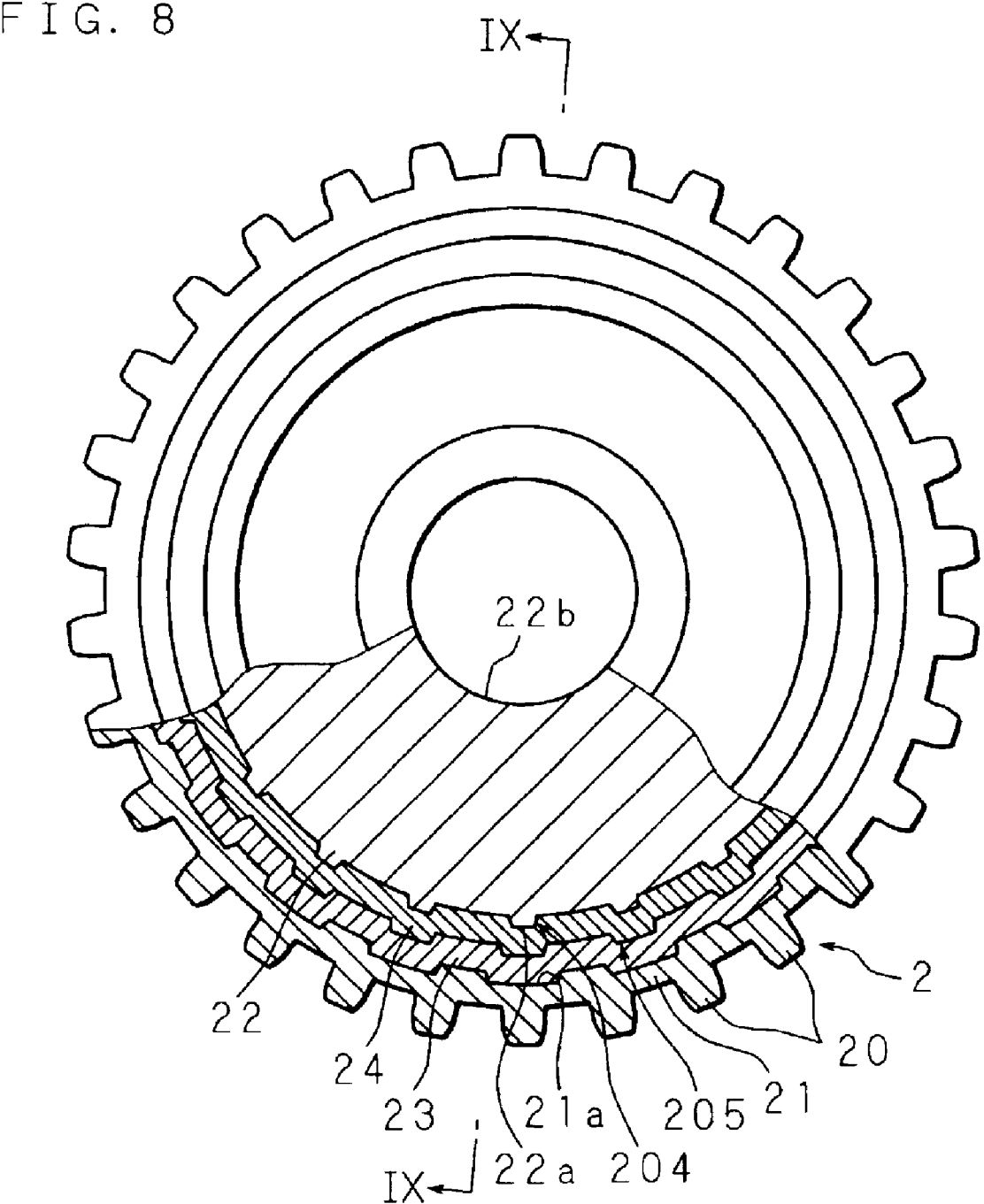
FIG. 8 is a front view which shows, partly in section, the structure of a worm wheel of the third embodiment of a gear combination according to the present invention.
Figure 9:
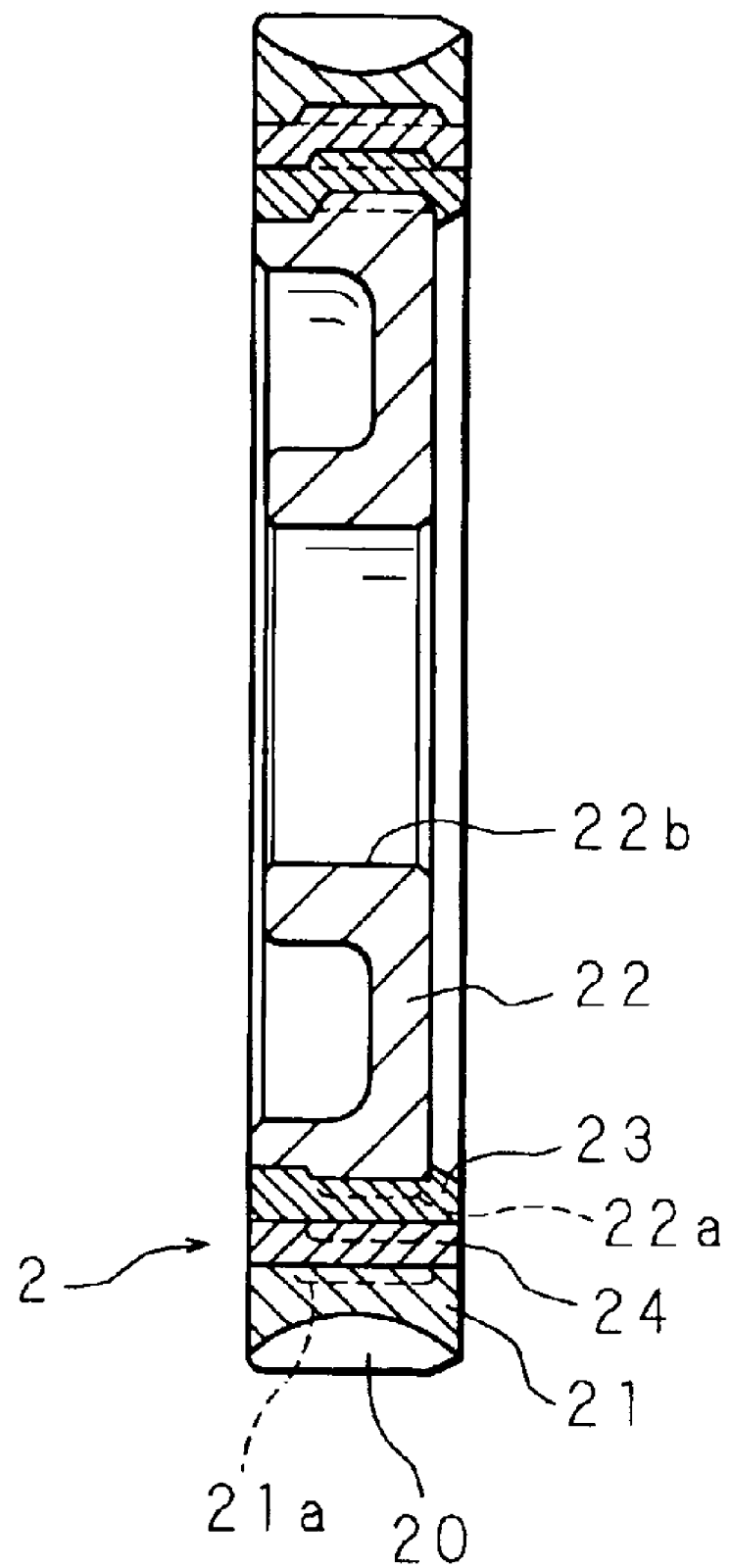
FIG. 9 is a sectional view taken along the line IX—IX in FIG. 8.

FIG. 8 is a front view which shows, partly in section, the structure of a worm wheel of the third embodiment of a gear combination according to the present invention; and FIG. 9 is a sectional view taken along the line IX—IX in FIG. 8.

The gear combination of the third embodiment has a coupling ring 24 made of synthetic resin between the core body 22 and the elastic coupler 23 in addition to the structure of the worm wheel 2 of the second embodiment.

In the third embodiment, the coupling ring 24 is formed by injecting melted synthetic resin including the same material as the annular tooth body 21 or other similar material into a mold for injection molding which houses the core body 22 arranged as an insert. The coupling ring 24 and the core body 22 are integrally bonded.

Relative turn limiting means 204 and 205, which are similar to the relative turn limiting means 202 and 203, are respectively provided between the core body 22 and the coupling ring 24, and between the coupling ring 24 and the elastic coupler 23. The relative turn limiting means 204 limits relative turn between the core body 22 and the coupling ring 24, while the relative turn limiting means 205 limits relative turn between the coupling ring 24 and the elastic coupler 23.

The elastic coupler 23 is formed annularly by putting an elastomer into a mold which houses the coaxially arranged core body 22 provided with the coupling ring 24 and the annular tooth body 21. By this forming method, the elastic coupler 23 is bonded through fusion with the inner surface of the annular tooth body 21 and the outer surface of the coupling ring 24. It should be understood that the elastic coupler 23 may be made of rubber as described in the second embodiment.

In the third embodiment, the worm wheel 2 has the coupling ring 24 made of synthetic resin, which is bonded with the outer surface of the core body 22. The worm wheel 2 further has the elastic coupler 23, which can be transformed in the radial direction, between the outer surface of the coupling ring 24 and the inner surface of the annular tooth body 21 made of synthetic resin. Since the elastic coupler 23 is bonded with the coupling ring 24 which has rigidity smaller than the core body 22 made of metal but larger than the elastic coupler 23 and can be transformed, the binding strength between the annular tooth body 21 and the core body 22 having the elastic coupler 23 therebetween is higher in the presence of the coupling ring 24, and thereby the durability is enhanced.

Since other structures and functions are the same as those of the first and second embodiments, like codes are used to refer to like parts and detailed explanation thereof are omitted here.

Figure 10:
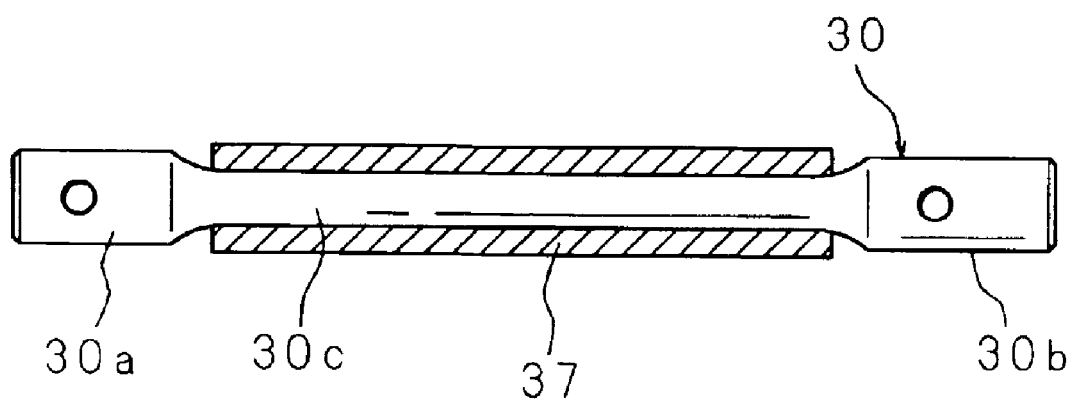
FIG. 10 is a front view showing the structure of a torsion bar of an electric power steering apparatus according to the present invention.

FIG. 10 is a front view showing the structure of a torsion bar of an electric power steering apparatus according to the present invention.

In the electric power steering apparatus described above, the torsion bar 30 has coupling portions 30a and 30b provided at the ends thereof where the torsion bar 30 is coupled with an input shaft 9 and an output shaft 31, and a tortile portion 30c provided between the coupling portions 30a and 30b. An elastic member 37 for depressing resonance of the torsion bar 30 is provided on the outer surface of the tortile portion 30c.

The elastic member 37 is made of elastic material, such as synthetic rubber, having damping ability. The elastic member 37 is provided with a through bore having a diameter smaller than the coupling portions 30a and 30b, and formed cylindrically so as to be engaged with the tortile portion 30c over approximately the total length thereof. It should be understood that the elastic member 37 may be formed by putting vulcanized rubber into a mold which houses the torsion bar 30.

In the electric power steering apparatus thus constructed, gaps in the radial direction are formed at supported portions of the input shaft 9 and the output shaft 31 which are supported at the housing 6 by bearings such as the bearings 36 and antifriction bearings 34 and 35. In the presence of the gaps, when the steering wheel 8 and the input shaft 9 and output shaft 31 connected with the steering wheel 8 swing in the radial direction with vibration of the vehicle and the torsion bar 30 connected to the input shaft 9 and output shaft 31 resonates while the vehicle is, for example, running a rough road, the elastic member 37 can depress the resonance of the torsion bar 30. As a result, depression of the resonance of the torsion bar 30 leads to a decrease of amplitude at the supported portions of the input shaft 9 and the output shaft 31 and to depression of rattling noise generated at the supported portions, and thereby rattling noise is not heard in the passenger's room.

The gear combination A described in the above embodiments may employ, instead of the worm 1 as a pinion and the worm wheel 2 as a gear wheel, spur gears as a pinion and a gear wheel.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A gear comprising:
   an annular tooth body having a tooth on an outer surface thereof;
   a core body inserted inside the annular tooth body, at least one of the inner surface of the tooth body and the outer surface of the core body being non-circular and having at least one projection and one depression; and
   a coupler of elastic material in the space between and engaging the at least one of the non-circular inner surface of the annular tooth body and the outer surface of the core body to couple the core body with the annular tooth body by engagement with the at least one projection and depression.

2. The gear according to claim 1, wherein the portions of the coupler that engage the non-circular portion of the at least one of the tooth body inner surface and core body outer surface form a limiting mechanism for limiting relative rotation between the annular tooth body and the coupler and relative rotation between the core body and the coupler.

3. The gear according to claim 2, wherein the annular tooth body is made of synthetic resin and the core body is made of metal.

4. The gear according to claim 3, wherein the coupler is coupled with the core body via a coupling ring made of synthetic resin having larger rigidity than the elastic material of the coupler.

5. The gear according to claim 1, wherein the annular tooth body is made of synthetic resin and the core body is made of metal.

6. The gear according to claim 5, wherein the coupler is coupled with the core body via a coupling ring made of synthetic resin having larger rigidity than the elastic material of the coupler.

7. The gear according to claim 1 wherein both the inner surface of the tooth body and the outer surface of the core body are non-circular and have at least one projection and depression engaged by the coupler of elastic material.

8. The gear according to claim 7 wherein the inner surface of the tooth body and the outer surface of the core body have a cruciform cross-section.

9. A reduction gear combination comprising a pinion and a gear wheel engaged with the pinion,
   wherein at least one of the pinion and the gear wheel has:
   an annular tooth body having a tooth on an outer surface thereof;
   a core body inserted inside the annular tooth body, at least one of the inner surface of the tooth body and the outer surface of the core body being non-circular and having at least one projection and one depression; and
   a coupler of elastic material in the space between and engaging the at least one of the non-circular inner surface of the annular tooth body and the outer surface of the core body to couple the core body with the annular tooth body.

10. The reduction gear combination according to claim 9, wherein the portions of the coupler that engage the non-circular portion of the at least one of the tooth body inner surface and core body outer surface form a limiting mechanism for limiting relative rotation between the annular tooth body and the coupler and relative rotation between the core body and the coupler.

11. The reduction gear combination according to claim 10, wherein the annular tooth body is made of synthetic resin and the core body is made of metal.

12. The reduction gear combination according to claim 11, wherein the coupler is coupled with the core body via a coupling ring made of synthetic resin having larger rigidity than the elastic material of the coupler.

13. The reduction gear combination according to claim 9, wherein the annular tooth body is made of synthetic resin and the core body is made of metal.

14. The reduction gear combination according to claim 13, wherein the coupler is coupled with the core body via a coupling ring made of synthetic resin having larger rigidity than the elastic material of the coupler.

15. The reduction gear combination according to claim 9 wherein both the inner surface of the tooth body and the outer surface of the core body are non-circular and have at least one projection and depression engaged by the coupler of elastic material.

16. The reduction gear combination according to claim 15 wherein the inner surface of the tooth body and the outer surface of the core body have a cruciform cross-section.

17. An electric power steering apparatus comprising:
    a reduction gear combination including a pinion and a gear wheel engaged with the pinion;
    a steering assist motor connected with the pinion; and
    a transmitting unit for transmitting rotation of the gear wheel associated with rotation of the motor to a steering mechanism,
    wherein at least one of the pinion and the gear wheel has:
    an annular tooth body having a tooth on an outer surface thereof;

a core body inserted inside the annular tooth body, at least one of the inner surface of the tooth body and the outer surface of the core body being non-circular and having at least one projection and one depression; and a coupler of elastic material in the space between and engaging the at least one of the non-circular inner surface of the annular tooth body and the outer surface of the core body to couple the core body with the annular tooth body by engagement with the at least one projection and depression.

18. The electric power steering apparatus according to claim 17, wherein the portions of the coupler that engage the non-circular portion of the at least one of the tooth body inner surface and core body outer surface form a limiting mechanism for limiting relative rotation between the annular tooth body and the coupler and relative rotation between the core body and the coupler.

19. The electric power steering apparatus according to claim 18, wherein the annular tooth body is made of synthetic resin and the core body is made of metal.

20. The electric power steering apparatus according to claim 19, wherein the coupler is coupled with the core body via a coupling ring made of synthetic resin having larger rigidity than the elastic material of the coupler.

21. The electric power steering apparatus according to claim 17, wherein the annular tooth body is made of synthetic resin and the core body is made of metal.

22. The electric power steering apparatus according to claim 21, wherein the coupler is coupled with the core body via a coupling ring made of synthetic resin having larger rigidity than the elastic material of the coupler.

23. The electric power steering apparatus according to claim 17 wherein both the inner surface of the tooth body and the outer surface of the core body are non-circular and have at least one projection and depression engaged by the coupler of elastic material.

24. The electric power steering apparatus according to claim 23 wherein the inner surface of the tooth body and the outer surface of the core body have a cruciform cross-section.

* * * * *

UNITED STATES PATENT AND TRADEMARK OFFICE
CERTIFICATE OF CORRECTION

PATENT NO. : 6,988,582 B2  Page 1 of 1
DATED : January 24, 2006
INVENTOR(S) : Etsurou Kitami et al.

It is certified that error appears in the above-identified patent and that said Letters Patent is hereby corrected as shown below:

<u>Title page,</u>
Item [30], Foreign Application Priority Data, delete
"November 1, 2002 (JP)................2002-005364" and insert
-- January 11, 2002 (JP)................2002-005364 --.

Signed and Sealed this

Fourth Day of April, 2006

JON W. DUDAS
*Director of the United States Patent and Trademark Office*